Aug. 10, 1926.

R. B. SPAID 1,595,127

STICK EJECTING APPARATUS

Filed July 30, 1925    2 Sheets-Sheet 1

Russel B. Spaid
INVENTOR

BY
his ATTORNEY

Aug. 10, 1926.

R. B. SPAID

STICK EJECTING APPARATUS

Filed July 30, 1925  2 Sheets-Sheet 2

1,595,127

Russel B. Spaid
INVENTOR

BY

ATTORNEY.

Patented Aug. 10, 1926.

1,595,127

UNITED STATES PATENT OFFICE.

RUSSEL B. SPAID, OF NEWARK, NEW JERSEY, ASSIGNOR TO CHARMS COMPANY, OF NEWARK, NEW JERSEY, A CORPORATION OF DELAWARE.

STICK-EJECTING APPARATUS.

Application filed July 30, 1925. Serial No. 47,026.

My invention relates to machines for producing a class of confection known as "stick sucker candy" and more particularly to that part, of such machines, which relates to the delivery of the finished product from an intermittently rotated table mold; this invention being a development of the machine described and claimed in the pending application, Serial No. 608,431, filed December 22nd, 1922.

The principal object of the invention is to provide an attachment for candy machinery of the character referred to, in which the finished stick candies are successively ejected from an intermittently rotated table mold.

Figure 1:
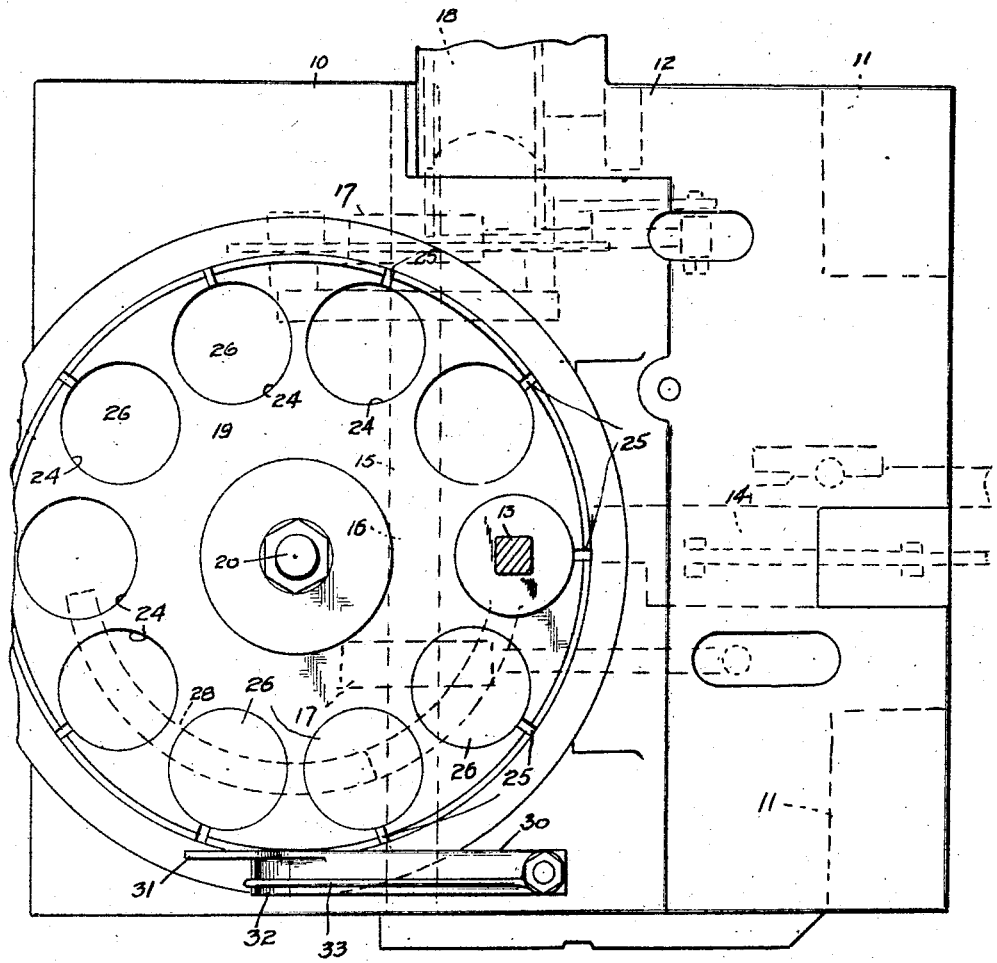
Figure 2:
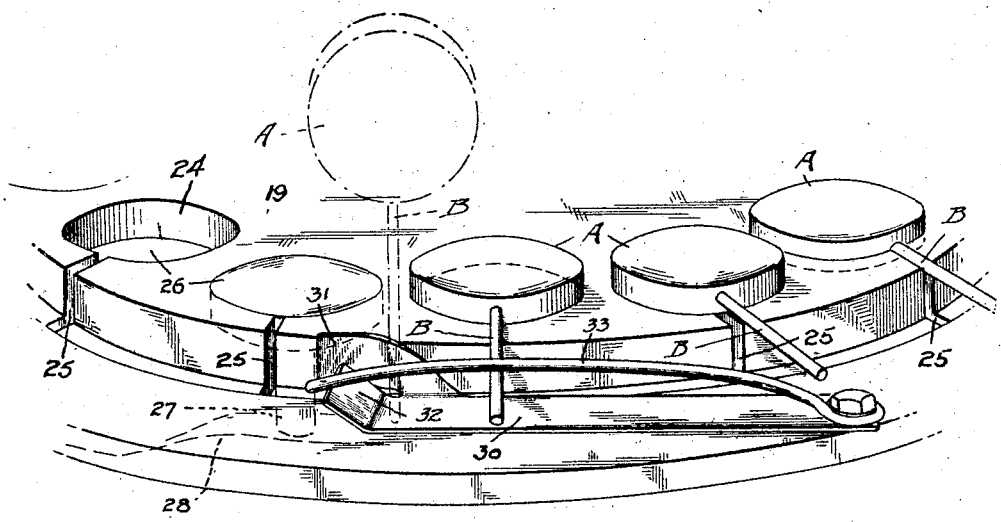
Figure 3:
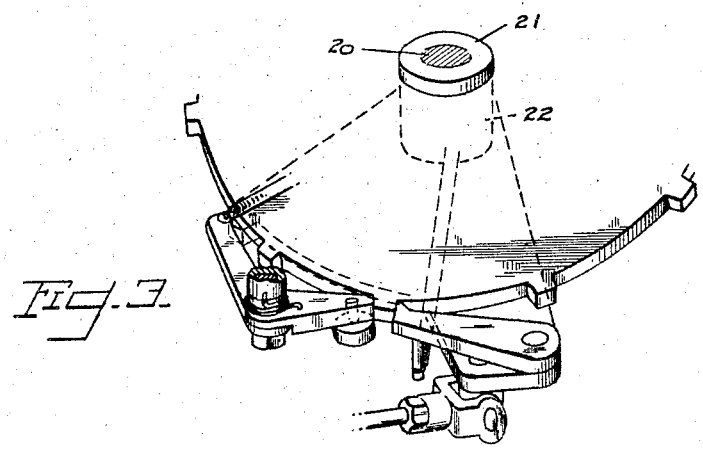

The invention is illustratively exemplified in the accompanying drawing, in which, Figure 1 is a plan view of a candy machine having my improved ejecting attachment incorporated therein; Figure 2, is a side elevational view of the same; and Figure 3 is a perspective of the means for intermittently rotating the table mold.

The parts and operation of the complete stick candy machine will be briefly described in the following, and only such mechanisms, as are connected and effect the operation of my present invention, will be set forth in detail.

Referring to the drawings, 10 designates a suitable bed plate supported on standards 11 and having a raised rear section 12 which carries a reciprocating plunger 13 and stick feeding mechanism 14. Power mechanism 15 for operating the several units of the complete machine is disposed beneath the bed plate 10 and comprises a power shaft 16 and a series of eccentrics 17 suitably connected to the moving parts and arranged on the shaft 16 so that rotary movement thereof will impart the desired duration of movement to each unit in its proper order. A sizing and cutting unit 18 is supported at one side of the bed plate 10 and delivers a predetermined amount of pliable candy substance to a rotating table mold 19 which is mounted laterally above the bed plate 10 and on a plane level with the raised section 12. The table 19 is fixed to the upper end of a vertical shaft 20 bearing in an upright pedestal 21, which is preferably integral with the surface of the bed plate 10 and at its upper end bears against the hub of the said table. The opposite lower end of the shaft 20 is supported in a bracket 22 forming an integral part of the underside of the bed plate.

The table mold 19 comprises a circular plate of substantial thickness having a plurality of spaced recesses or die molds 24, disposed marginally thereabout and spaced inwardly from the periphery thereof. The table 19 is provided with a plurality of radially cut slots 25, one for each die mold cavity 24 and projecting laterally between the latter and the periphery of the table, and in an upright direction from a plane substantially one half the depth of the cavities 24. The cavities 24 are preferably circular and the bottom wall of each comprises a die plate 26 having a depending stem 27, which projects through and below the plate 19, and which during a certain segment in its circular movement with the table, engages an inclined cam surface 28 arranged on the surface of the bed plate 10. The cam 28 is inclined upwardly in the direction of travel of the plate 19, i. e. in a clockwise direction, so that movement of the stems 27 over the cam 28 will cause the former and the die plates 26 to gradually raise to the surface of the mold. Candy sections A having been formed and provided with a stick B by the operation of the plunger 13 and stick feeding and inserting mechanism 14, remains in the die mold cavity 24 until the die plate 26 is elevated to the surface, whereupon the candy rests upon the surface of the revolving table. As previously stated, the table 19 rotates intermittently, that is to say, it moves about its center the distance between centers of the die mold cavities 24, then pauses, and moves on again.

Heretofore, as the finished candies were raised to the surface of the rotating table 19 it has been necessary to employ an operator to remove them.

The attachment for mechanically removing the finished candies from the moving table according to the present invention comprises a flat metal arm 30 attached at one end to the raised section 12 of the bed plate 10, and projecting towards the flanged periphery of the circular table 19 in a line disposed tangentially thereof. The extreme free end of the arm 30 is split longitudinally, and the section 31 adjacent the table is twisted to a position, which brings the surface of the section 31 in contact with the upright peripheral wall of the table. The outside section 32 of the arm is curved upwardly at its end so as to provide a transverse lip projecting outwardly from the outside face of the section 31. A bow shaped wire member 33 is superimposed over the arm 30, one end of the wire being secured to the fixed end of the arm, and the opposite end yieldably bearing down upon the midpoint of the upturned transverse lip of the section 32. The wire member 33 is so arranged that the bowed midportion thereof is slightly above the plane of the surface of the table 19, an arrangement which enables the radially projecting sticks B in their travel with the table to be admitted between the wire 33 and arm 30. The relation of the contacting point of the section 32 and wire member 33, and that of the stop positions of the two adjacent mold cavities 24, is such that during movement of the table one step, i. e., the distance between centers of the mold cavities 24, the projecting stick B will engage and ride up on the inclined edge of the section 31, while the extreme end is being yieldably held down by the wire member 33, as set forth in the following description of operation.

The operation of my invention is as follows: It will be assumed that the candy molds have been filled, the candy shaped, and a stick inserted, in the manner described, and further, that a certain mold cavity containing the formed candy is advanced to the stop position before passing the tangent point of the table and arm; then the candy and stick will have started on their upright movement in the mold cavity and the free end of the stick B will have entered the space beneath the wire member 33. The table 19 now advances rapidly to its next stop position, an operation which causes the stick B to move quickly towards the inclined upturned edge of the section 31 and upon contact therewith the head or candy portion of the product is raised rapidly while the extreme free end of the stick B is yieldably held down by the wire 33. The rapidity with which this operation is effected causes the stick B to virtually pivot about the overhead fire member 33, and the momentum gathered by the candy head in its rapid elevation causes the latter to swing free of the table and wire 33 where a certain angle is attained, whereupon the product is projected from the machine and may be collected in suitable receptacles or deposited upon a conveyor belt which operates in connection with a dryer.

What I claim is:

1. In stick candy manufacturing machinery, the combination of a die mold turn table adapted to accommodate candy heads and radially arranged sticks projecting from said heads, and means for removing the stick candy from the table comprising an inclined edge adapted to elevate the candy head, and a member spaced outwardly from said inclined edge and arranged over the path of movement of the sticks, whereby the latter are held depressed during elevation of the heads to a certain angle.

2. An attachment for removing stick candy products from revolving turn tables of the character described, comprising a flat arm arranged tangentially with respect to the periphery of said table and having the end adjacent the table provided with a longitudinal slit, the section on one side of the slit adjacent the table being bent upright and parallel to the peripheral wall of said table, and the outside section being curved upwardly at its end, and a wire member fixed at one end and projecting parallel to and over the arm and further having its free end resting upon the upturned lip of the outside section, the upright edge of the first section being inclined from a point below the turn table to a point substantially above the table, and the elevation of a portion of the wire member being above that of the upper surface of the table.

3. In stick candy manufacturing machinery, the combination of an intermittently rotated turn table having a marginally disposed series of die mold cavities, the centers of which are spaced apart the distance the table moves between stops, said table being provided with a radial groove projecting from each cavity to the periphery and having a lateral annular flange projecting from the lower edge of the peripheral wall, and means disposed tangentially of said wall and supported on said flange for removing the finished candy from the table during movement thereof.

4. An attachment for removing stick candy products from a revolving table of the character described, comprising means for diverting the head of the candy from a lateral movement of the product on the table to a rapid upwardly inclined movement, and means, about which the stick turns to a certain angle during its upward inclined travel, until the product swings free from both the table and means.

In testimony whereof I affix my signature.

RUSSEL B. SPAID.